United States Patent
Wu et al.

(10) Patent No.: US 11,402,680 B2
(45) Date of Patent: Aug. 2, 2022

(54) ELECTRONIC DEVICE

(71) Applicant: InnoLux Corporation, Miao-Li County (TW)

(72) Inventors: Ming-Han Wu, Miao-Li County (TW); Chien-Feng Li, Miao-Li County (TW); Hsin-Hao Huang, Miao-Li County (TW); Chu-Hong Lai, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 17/151,644

(22) Filed: Jan. 18, 2021

(65) Prior Publication Data

US 2021/0255499 A1    Aug. 19, 2021

(30) Foreign Application Priority Data

Feb. 17, 2020 (CN) .......................... 202010097542.0

(51) Int. Cl.
*G02F 1/1333* (2006.01)
*G02F 1/1335* (2006.01)
*G02F 1/1368* (2006.01)

(52) U.S. Cl.
CPC ...... *G02F 1/133305* (2013.01); *G02F 1/1368* (2013.01); *G02F 1/133308* (2013.01); *G02F 1/133514* (2013.01); *G02F 2202/28* (2013.01)

(58) Field of Classification Search
CPC ............ G02F 1/1333; G02F 1/133305; G02F 1/133308; G02F 1/133311; G02F 1/133331; G02F 1/1335; G02F 1/133514; G02F 1/133528; G02F 1/1368; G02F 1/1339; G02F 2202/28; G02F 2201/50
See application file for complete search history.

(56) References Cited

U.S. PATENT DOCUMENTS

2018/0101044 A1   4/2018   Oka
2021/0150941 A1*   5/2021   Bu .......................... G09F 9/301

* cited by examiner

*Primary Examiner* — Thoi V Duong
(74) *Attorney, Agent, or Firm* — Winston Hsu

(57) ABSTRACT

The present disclosure provides an electronic device including a first flexible substrate, a second flexible substrate, a liquid crystal layer and a supporting structure. The second flexible substrate includes a first region and a second region. The first region overlaps with the first flexible substrate, and the second region does not overleap with the first flexible substrate. The liquid crystal layer is disposed between the first flexible substrate and the second flexible substrate. The supporting structure is disposed on the second region and includes a supporting film.

17 Claims, 6 Drawing Sheets

ELECTRONIC DEVICE

BACKGROUND OF THE DISCLOSURE

1. Field of the Disclosure

The present disclosure relates to an electronic device, and more particularly to an electronic device capable of improving reliability or yield.

2. Description of the Prior Art

Electronic devices are broadly applied and have become necessities in modern life. With the enormous growth of portable electronic products, consumers have high expectations for the quality, function or price of these products.

However, the current electronic devices still do not fully meet the requirements For example, because of being bended, traces or elements in the peripheral area of the electronic devices are easily damaged. Therefore, the reliability or yield of the electronic devices is reduced. So far, there are still some problems needed to be solved.

SUMMARY OF THE DISCLOSURE

An embodiment of the present disclosure provides an electronic device including a first flexible substrate, a second flexible substrate, a liquid crystal layer and a supporting structure. The second flexible substrate includes a first region and a second region. The first region overlaps with the first flexible substrate, and the second region does not overleap with the first flexible substrate. The liquid crystal layer is disposed between the first flexible substrate and the second flexible substrate. The supporting structure is disposed on the second region and includes a supporting film.

DETAILED DESCRIPTION

Figure 1:
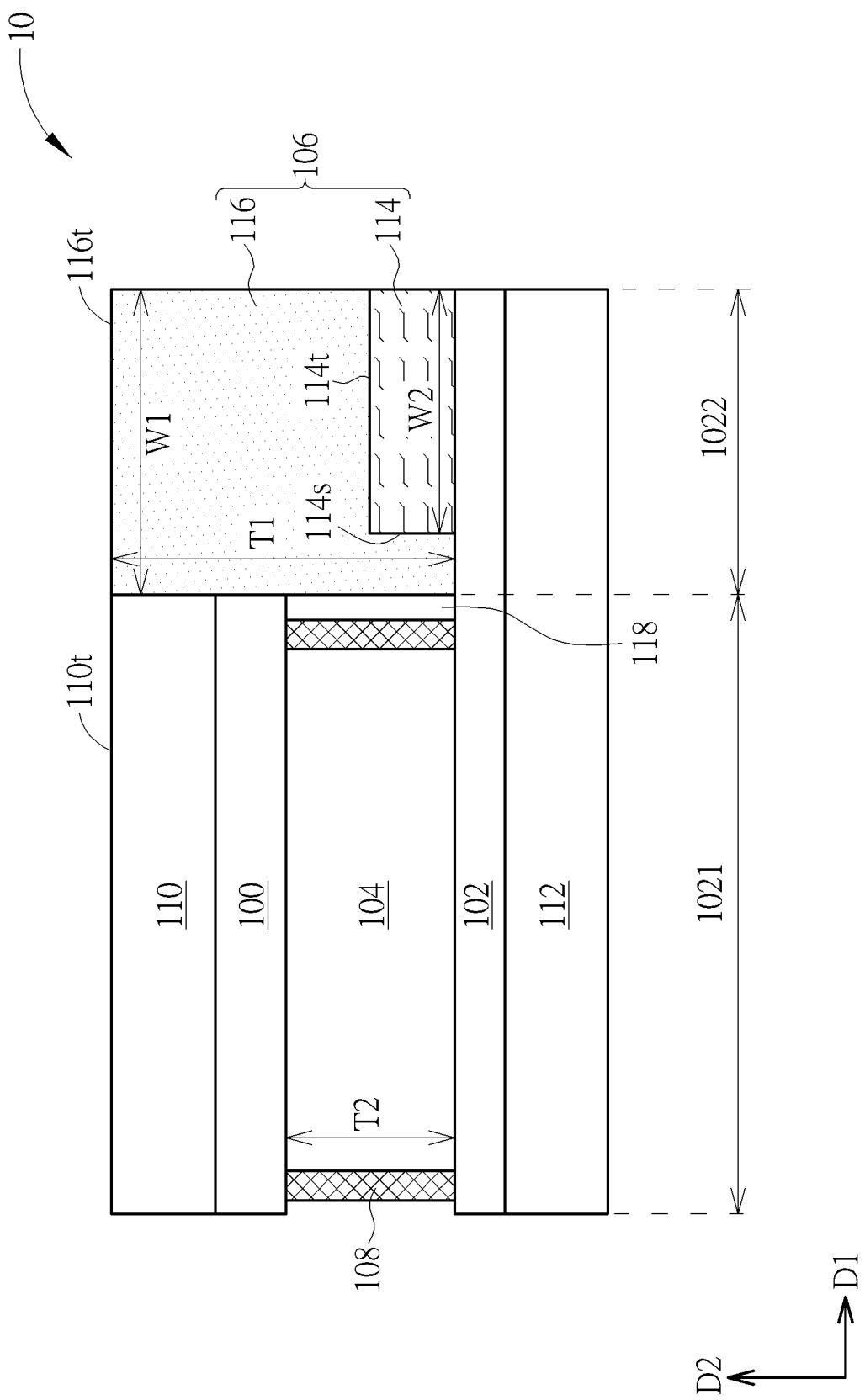
FIG. 1 is a schematic diagram of an electronic device of a first embodiment of the present disclosure.

The present disclosure may be understood by reference to the following detailed description, taken in conjunction with the drawings as described below. It is noted that, for purposes of illustrative clarity and being easily understood by the readers, various drawings of this disclosure show a portion of the electronic device, and certain elements in various drawings may not be drawn to scale. In addition, the number and dimension of each element shown in drawings are only illustrative and are not intended to limit the scope of the present disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ".

It should be understood that when an element or layer is referred to as being "on" or "connected to" another element or layer, it may be directly on or directly connected to the other element or layer, or intervening elements or layers may be presented (indirect condition). In contrast, when an element is referred to as being "directly on" or "directly connected to" another element or layer, there are no intervening elements or layers presented.

The terms "about", "substantially", "practically", "equal to", "identical to" or "the same as" mentioned in this document generally mean being within 20% of a given value or range, or being within 10%, 5%, 3%, 2%, 1% or 0.5% of a given value or range.

Although terms such as first, second, third, etc., may be used to describe diverse constituent elements, such constituent elements are not limited by the terms. The terms are used only to discriminate a constituent element from other constituent elements in the specification. The claims may not use the same terms, but instead may use the terms first, second, third, etc. with respect to the order in which an element is claimed. Accordingly, in the following description, a first constituent element may be a second constituent element in a claim.

It should be noted that the technical features in different embodiments described in the following can be replaced, recombined, or mixed with one another to constitute another embodiment without departing from the spirit of the present disclosure.

The electronic device of the present disclosure may, for example, include a display device, an antenna device, a touch display, a curved display or a free shape display, but not limited herein. The electronic device may be a bendable or flexible electronic device. The electronic device may include light-emitting diodes, liquid crystals, fluorescence, phosphors, other suitable display media or combinations of the above, but not limited herein. The light-emitting diodes may, for example, include organic light-emitting diodes (OLEDs), inorganic light-emitting diodes (LEDs), mini-light-emitting diodes (mini LEDs, millimeter sized LEDs), micro-light-emitting diodes (micro-LEDs, micrometer sized LEDs), quantum dots (QDs) light-emitting diodes (e.g. QLEDs or QDLEDs), other suitable light-emitting diodes or any arrangement and combinations of the above, but not limited herein.

The antenna device may be, for example, a liquid crystal antenna or other types of antennas, but not limited herein. It should be noted that, the electronic device may also be any arrangement and combinations of the devices describe above, but not limited herein. In addition, the appearance of the electronic device may be rectangular, circular, polygonal, a shape with curved edges or other suitable shapes. The electronic device may have external systems such as a driving system, a control system, a light source system, a shelf system, etc. to support a display device or an antenna device. In the following, a display device will be used as the electronic device to illustrate the contents of the present disclosure, but the present disclosure is not limited herein. If the electronic device is an antenna device or other device, a minimum operating unit thereof may correspond to a sub-pixel of a display device, but not limited herein.

A display device may include a plurality of sub-pixels arranged side by side with each other. The sub-pixel may include, for example, a light-emitting element, a corresponding color filter layer and/or a circuit layer or other corresponding layers, but not limited herein. In an embodiment, the sub-pixels in the display device may include green, red and blue sub-pixels, or include green, red, blue and yellow sub-pixels, or include green, red, blue and white sub-pixels, so as to display color images through different colors of light generated by the sub-pixels, but not limited herein. The colors of light provided by the sub-pixels may be designed according to requirements. In another embodiment, the display device may be a single color display device, and all of the sub-pixels may emit light of a single color, such as white, red or any suitable color. In addition, the top-view shape of the sub-pixel may be rectangular, parallelogram, ">" shape or any suitable shape. It should be noted that, the electronic device may be any arrangement and combinations of the above, but not limited herein.

Please refer to FIG. 1, which is a schematic diagram of an electronic device of a first embodiment of the present disclosure. In some embodiments, the electronic device 10 (or the display device) may include a first flexible substrate 100, a second flexible substrate 102, a liquid crystal layer 104 and a supporting structure 106. The first flexible substrate 100 is disposed opposite to the second flexible substrate 102. The first flexible substrate 100 may include elements such as a flexible base, a color filter, an alignment film, and other elements, but not limited herein. The second flexible substrate may include elements such as a flexible base, a thin film transistor layer, an alignment film, and other elements, but not limited herein. The detailed structures of the first flexible substrate 100 and the second flexible substrate 102 will be detailed in the following embodiments. In some embodiments, the length or area of the second flexible substrate 102 may be greater than the length or area of the first flexible substrate 100. The second flexible substrate 102 may include a first region 1021 and a second region 1022, the first region 1021 may overlap with the first flexible substrate 100, and the second region 1021 may not overlap with the first flexible substrate 100. That is to say, when the second region 1022 is viewed from the top, the second region 1022 is not covered by the first flexible substrate 100, so that the second region 1022 may be exposed from the first flexible substrate 100. For example, the second region 1022 of the second flexible substrate 102 may protrude from the first flexible substrate 100, or may not be covered by the first flexible substrate 100, but not limited herein. In addition, the second flexible substrate 102 may have a driving circuit, and the driving circuit may be disposed in the second region 1022, but not limited herein. In some embodiments, the second region 1022 of the second flexible substrate 102 may be, for example, a peripheral region of the display device, and the first region 1021 of the second flexible substrate 102 may be, for example, a display region of the display device, but not limited herein.

The liquid crystal layer 104 may be disposed between the first flexible substrate 100 and the second flexible substrate 102. In addition, the electronic device 10 may further include a sealant 108 disposed between the first flexible substrate 100 and the second flexible substrate 102 and surrounding the liquid crystal layer 104, but not limited herein. In some embodiments, the electronic device 10 may include a polarizer 110 and an another polarizer 112. The polarizer 110 may be disposed on the first flexible substrate 100, or the first flexible substrate 100 may be disposed between the polarizer 110 and the liquid crystal layer 104.

The polarizer 112 may be disposed on the second flexible substrate 102, or the second flexible substrate 102 may be disposed between the polarizer 112 and the liquid crystal layer 104.

A first direction D1 and a second direction D2 are labeled in FIG. 1, wherein the first direction D1 may be perpendicular to the second direction D2, but not limited herein. The first direction D1 may be, for example, a horizontal direction, and the second direction D2 may be, for example, parallel to a top-view direction, but not limited herein. As shown in FIG. 1, the supporting structure 106 may be disposed on the second region 1022 of the second flexible substrate 102 in the second direction D2, and when viewed from the top direction (such as parallel to the second direction D2), the supporting structure 106 may be disposed on one side (such as the right side) of the liquid crystal layer 104, the first flexible substrate 100 and/or the polarizer 110 in the first direction D1, but not limited herein. When the supporting structure 106 is disposed on the second flexible substrate 102, the second flexible substrate 102 may be supported by the supporting structure 106 in the second region 1022 and thus may not be bent by external force.

In some embodiments, the supporting structure 106 may include a supporting film 114. Please refer to FIG. 2, which is a schematic diagram of the supporting film 114 of the first embodiment of the present disclosure. In some embodiments, the supporting film 114 may include a base 1141, a first adhesive layer 1142 and a second adhesive layer 1143, and the base 1141 may be disposed between the first adhesive layer 1142 and the second adhesive layer 1143, but not limited herein. The material of the base 1141 may include polyethylene terephthalate (PET), polypropylene (PP), polyethylene (PE) or the combinations of the above, but not limited herein. In some embodiments, the second adhesive layer 1143 may be replaced by a release film, and the release film may be removed in the structure, but not limited herein.

The second flexible substrate 102 may also have a flexible base therein. When the second region 1022 of the second flexible substrate 102 protrudes from the first flexible substrate 100, the second region 1022 of the second flexible substrate 102 may curl. Therefore, in some embodiments, the Young's modulus (or stiffness) of the supporting film 114 may be greater than the Young's modulus (or stiffness) of the flexible base in the second flexible substrate 102, so that the curling of the second region 1022 may be reduced or mitigated by the supporting film 114 or the supporting structure 106, thereby eliminating the damage of the elements in the second region 1022 to improve the reliability or yield of the electronic device 10.

In some embodiments, the supporting structure 106 may further include a glue 116, and the glue 116 may cover at least a portion of the supporting film 114. As shown in FIG. 1, the supporting film 114 may be disposed between the glue 116 and the second flexible substrate 102, but not limited herein. Therefore, the supporting film 114 may be adhered to the second region 1022 of the second flexible substrate 102 by the glue 116, but not limited herein. In addition, a portion of the glue 116 may be disposed between the supporting film 114 and the liquid crystal layer 104 (or the sealant 108) in the first direction D1. For example, the glue 116 may cover the top surface 114$t$ and the side surface 114$s$ of the supporting film 114, but not limited herein. For example, the width W1 of the glue 116 may be greater than the width W2 of the supporting film 114, but not limited herein. For example, the width W1 of the glue 116 may be the width of the top surface 116$t$ of the glue 116 measured along the first direction D1 when viewed from a top direction (e.g., parallel to the second direction D2), but not limited herein. On the other hand, the width W2 of the supporting film 114 may be the width of the top surface 114t of the supporting film 114 measured along the first direction D1 when viewed from the top direction (e.g., parallel to the second direction D2), but not limited herein. In addition, a gap 118 may exist between the glue 116 and the liquid crystal layer 104, and more specifically, the gap 118 may exist between the glue 116 and the sealant 108, but not limited herein. Because of the gap 118 between the glue 116 and the sealant 108, the glue 116 may reduce the intrusion of vapor into the elements in the second region 1022 of the second flexible substrate 102, or reduce the intrusion of vapor into the elements in the first region 1021 of the second flexible substrate 102 or the elements disposed thereon (such as the liquid crystal layer 104, the elements in the first flexible substrate 100, etc.), so as to improve the reliability or yield of the electronic device 10.

For example, the glue 116 may be a waterproofing glue, but not limited herein. The material of the waterproofing glue may include silica gel, polyurethane (PU), polycarbonate (PC), poly(methyl methacrylate) (PMMA), polyethylene terephthalate (PET) or the combinations of the above, but not limited herein. The glue 116 may reduce the intrusion of vapor into the elements in the second region 1022 of the second flexible substrate 102, or reduce the intrusion of vapor into the elements in the first region 1021 of the second flexible substrate 102 or the elements disposed thereon (such as the liquid crystal layer 104, the elements in the first flexible substrate 100, etc.), so as to improve the reliability or yield of the electronic device 10.

In some embodiments, the glue 116 may have a top surface 116t on a side away from the second flexible substrate 102 in the second direction D2, the polarizer 110 may have a top surface 110t on a side away from the first flexible substrate 100 in the second direction D2, and the top surface 116t may be substantially aligned to the top surface 110t in the second direction D2, but not limited herein. The term "aligned to" described above may refer to that, for example, a plane extended from one of the top surface 116t and the top surface 110t in the first direction D1 coincides with the other one of the top surface 116t and the top surface 110t. In some embodiments, the difference between the top surface 116t and the top surface 110t in the second direction D2 may be less than or equal to 20 micrometers, but not limited herein. The difference described above may be, for example, a distance in the second direction D2 between a plane extended from one of the top surface 116t and the top surface 110t in the first direction D1 and the other one of the top surface 116t and the top surface 110t. In addition, as shown in FIG. 1, the glue 116 may be a waterproofing glue when the thickness T1 of the glue 116 is greater than the thickness T2 of the liquid crystal layer 104. When the thickness of the glue 116 is greater than the thickness of the liquid crystal layer 104, the intrusion of vapor from the sides of the liquid crystal layer is also mitigated, but not limited herein.

Some embodiments of the present disclosure will be disclosed in the following. In order to simplify the illustration, the same elements in the following would be labeled with the same symbol. For clearly showing the differences between various embodiments, the differences between different embodiments are described in detail below, and repeated features will not be described redundantly.

Figure 3:
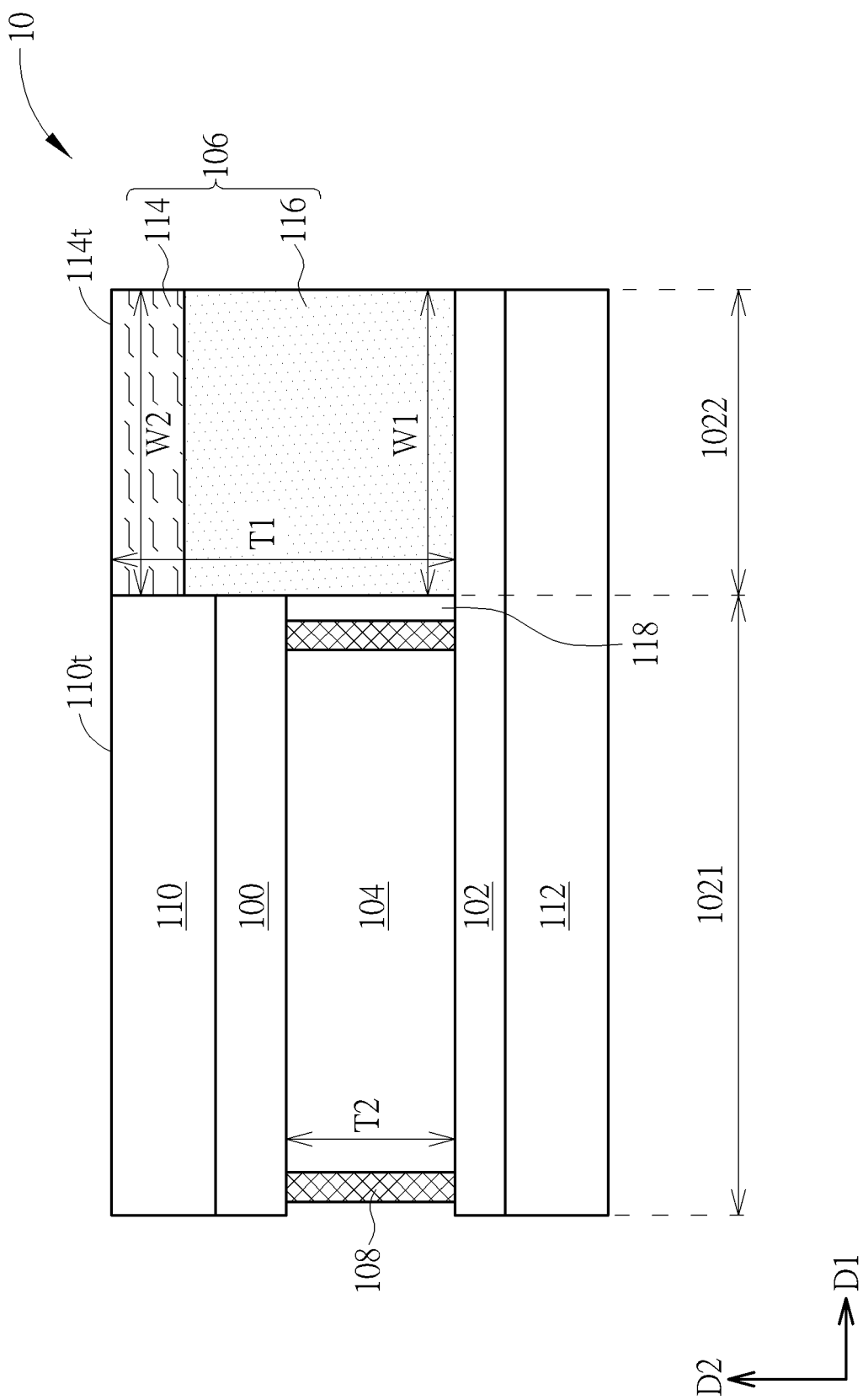
FIG. 3 is a schematic diagram of an electronic device of a second embodiment of the present disclosure.

Please refer to FIG. 3, which is a schematic diagram of an electronic device of a second embodiment of the present disclosure. In some embodiments, the glue 116 may be disposed between the supporting film 114 and the second flexible substrate 102, but not limited herein. The top surface 114t of the supporting film 114 may be substantially aligned to the top surface 110t of the polarizer 110 in the second direction D2, but not limited herein. The term "aligned to" described above may refer to that, for example, a plane extended from one of the top surface 114t and the top surface 110t in the first direction D1 coincides with the other one of the top surface 114t and the top surface 110t. For example, the difference between the top surface 114t and the top surface 110t in the second direction D2 may be less than or equal to 20 micrometers, but not limited herein. The difference described above may be, for example, a distance in the second direction D2 between a plane extended from one of the top surface 114t and the top surface 110t in the first direction D1 and the other one of the top surface 114t and the top surface 110t. In addition, in some embodiments, the width W1 of the glue 116 may be substantially equal to the width W2 of the supporting film 114, but not limited herein.

Figure 4:
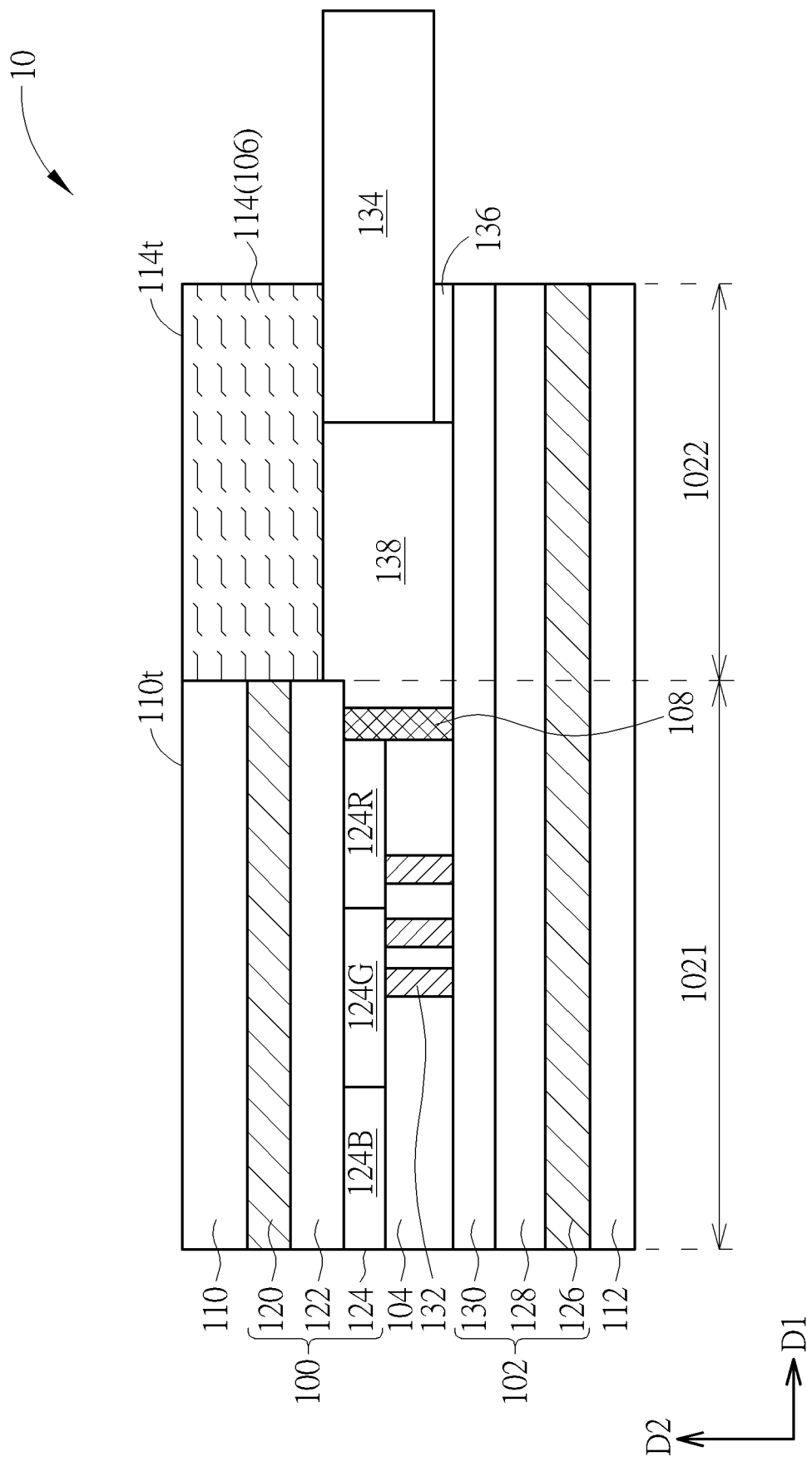
FIG. 4 is a schematic diagram of an electronic device of a third embodiment of the present disclosure.

Please refer to FIG. 4, which is a schematic diagram of an electronic device of a third embodiment of the present disclosure. In some embodiments, the first flexible substrate 100 may include a flexible base 120, a buffer layer 122 and a color filter layer 124, but not limited herein. The flexible base 120, the buffer layer 122 and the color filter layer 124 may be disposed between the polarizer 110 and the liquid crystal layer 104. The polarizer 110 may be disposed on one side of the flexible base 120 in the second direction D2, the buffer layer 122 may be disposed on the other side of the flexible base 120 in the second direction D2, and the color filter layer 124 may be disposed between the buffer layer 122 and the liquid crystal layer 104, but not limited herein. In some embodiments, the thickness of the polarizer 110 may range from 130 micrometers to 270 micrometers, but not limited herein. The material of the flexible base 120 may include polyimide (PI), but not limited herein. The thickness of the flexible base 120 may range from 10 micrometers to 20 micrometers, and the thickness may be, for example, 13 micrometers, but not limited herein. The thickness of the buffer layer 122 may range from 0.6 micrometers to 1 micrometer, but not limited herein. The color filter layer 124 may include blue filter units 124B, green filter units 124G and red filter units 124R, but not limited herein.

In some embodiments, the electronic device 10 may include a plurality of spacers 132 disposed in the liquid crystal layer 104 and/or disposed between the color filter layer 124 and a thin film transistor (TFT) layer 130, but not limited herein. In addition, as shown in FIG. 4, the sealant 108 may be at least disposed on one side of the color filter layer 124 and the liquid crystal layer 104 in the first direction D1, but not limited herein.

In some embodiments, the second flexible substrate 102 may include a flexible base 126, a buffer layer 128 and a thin film transistor layer 130, but not limited herein. The flexible base 126, the buffer layer 128 and the thin film transistor layer 130 may be disposed between the polarizer 112 and the liquid crystal layer 104. The polarizer 112 may be disposed on one side of the flexible base 126 in the second direction D2, the buffer layer 128 may be disposed on the other side of the flexible base 126 in the second direction D2, and the thin film transistor layer 130 may be disposed between the buffer layer 128 and the liquid crystal layer 104, but not limited herein. In some embodiments, the thickness of the polarizer 112 may range from 138 micrometers to 270 micrometers, but not limited herein. The material of the flexible base 126 may include polyimide (PI). The thickness of the flexible base 126 may range from 10 micrometers to 20 micrometers, and the thickness may be, for example, 13 micrometers, but not limited herein. The thickness of the buffer layer 128 may range from 0.6 micrometers to 1 micrometer, but not limited herein.

For example, the thin film transistor layer 130 may include switching elements, capacitors, electrodes and/or signal lines (such as scanning lines, data lines, etc.) of sub-pixels, and these elements may be disposed in the first region 1021, but not limited herein. On the other hand, the thin film transistor layer 130 may include traces, bonding pads, driving circuits, etc., and these elements may be disposed in the second region 1022, but not limited herein.

In some embodiments, the electronic device 10 may include a chip on film (COF) 134 disposed between the supporting structure 106 and the second flexible substrate in the second region 1022, and more specifically, the chip on film 134 may be disposed on the thin film transistor layer 130, but not limited herein. For example, the chip on film 134 may be adhered to the thin film transistor layer 130 (or the second substrate 102) by an anisotropic conductive film (ACF) 136, but not limited herein. The chip on film 134 may be electrically connected to the bonding pads in the thin film transistor layer 130 by the anisotropic conductive film 136, and may further be electrically connected to the driving circuits in the thin film transistor layer 130, but not limited herein. For example, the thickness of the chip on film 134 may range from 30 micrometers to 100 micrometers, and the thickness of the anisotropic conductive film 136 may range from 1 micrometer to 10 micrometers, but not limited herein.

In some embodiments, the supporting structure 106 may include the supporting film 114 and not include the glue 116, and the supporting film 114 may be disposed on the chip on film 134, but not limited herein. As shown in FIG. 4, a gap 138 may exist between the supporting film 114 and the thin film transistor layer 130 in the second direction D2, and/or a gap 138 may exist between the chip on film 134 and the liquid crystal layer 104 (or the sealant 108) in the first direction D1, but not limited herein. In addition, the top surface 114t of the supporting film 114 may be substantially aligned to the top surface 110t of the polarizer 110 in the second direction D2, but not limited herein. The term "aligned to" described above may refer to that, for example, a plane extended from one of the top surface 114t and the top surface 110t in the first direction D1 coincides with the other one of the top surface 114t and the top surface 110t. For example, the difference between the top surface 114t and the top surface 110t in the second direction D2 may be less than or equal to 20 micrometers, but not limited herein. The difference described above may be, for example, a distance in the second direction D2 between a plane extended from one of the top surface 114t and the top surface 110t in the first direction D1 and the other one of the top surface 114t and the top surface 110t.

Figure 2:
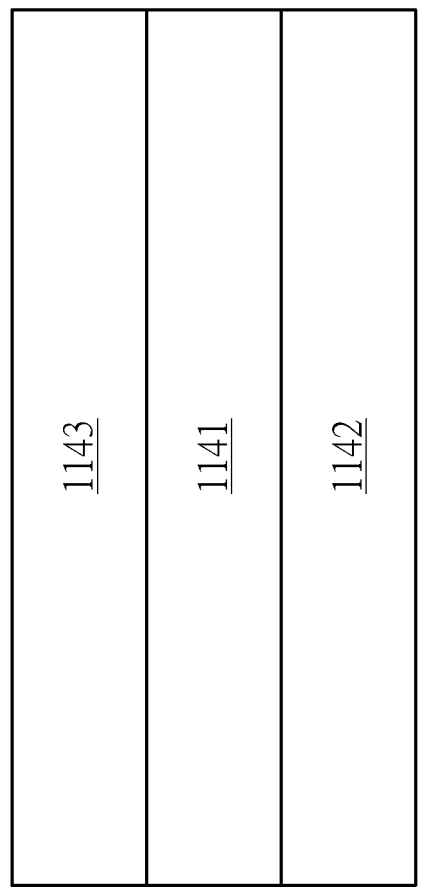
FIG. 2 is a schematic diagram of a supporting film of the first embodiment of the present disclosure.

Please also refer to FIG. 2, the thickness of the supporting film 114 may range from 50 micrometers to 350 micrometers in some embodiments, but not limited herein. The thickness of the base 1141 may range from 30 micrometers to 250 micrometers, the thickness of the first adhesive layer 1142 may range from 10 micrometers to 50 micrometers, and the thickness of the second adhesive layer 1143 (or the release film) may range from 10 micrometers to 50 micrometers, but not limited herein.

In some embodiments, the thickness of the base 1141 in the supporting film 114 may be 75 micrometers, the thickness of the first adhesive layer 1142 (or the thickness of the first adhesive layer 1142 and the second adhesive layer 1143) may be 25 micrometers, and the Young's modulus of the supporting film 114 may be 3.22 Gpa, but not limited herein. In addition, in some embodiments, the thickness of the base 1141 in the supporting film 114 may be 188 micrometers, the thickness of the first adhesive layer 1142 (or the thickness of the first adhesive layer 1142 and the second adhesive layer 1143) may be 25 micrometers, and the Young's modulus of the supporting film 114 may be 4.31 Gpa, but not the limited herein. On the other hand, the thickness of the flexible base 126 in the second flexible substrate 102 may be 13 micrometers, and the Young's modulus of the flexible base 126 may be 2.64 Gpa, but not limited herein. Therefore, the Young's modulus (or stiffness) of the supporting film 114 may be greater than the Young's modulus (or stiffness) of the flexible base 126 in the second flexible substrate 102, and the curling of the second region 1022 may be reduced or mitigated by the supporting film 114, thereby reducing the chance of damage of the elements in the second region 1022 to improve the reliability or yield of the electronic device 10.

Figure 5:
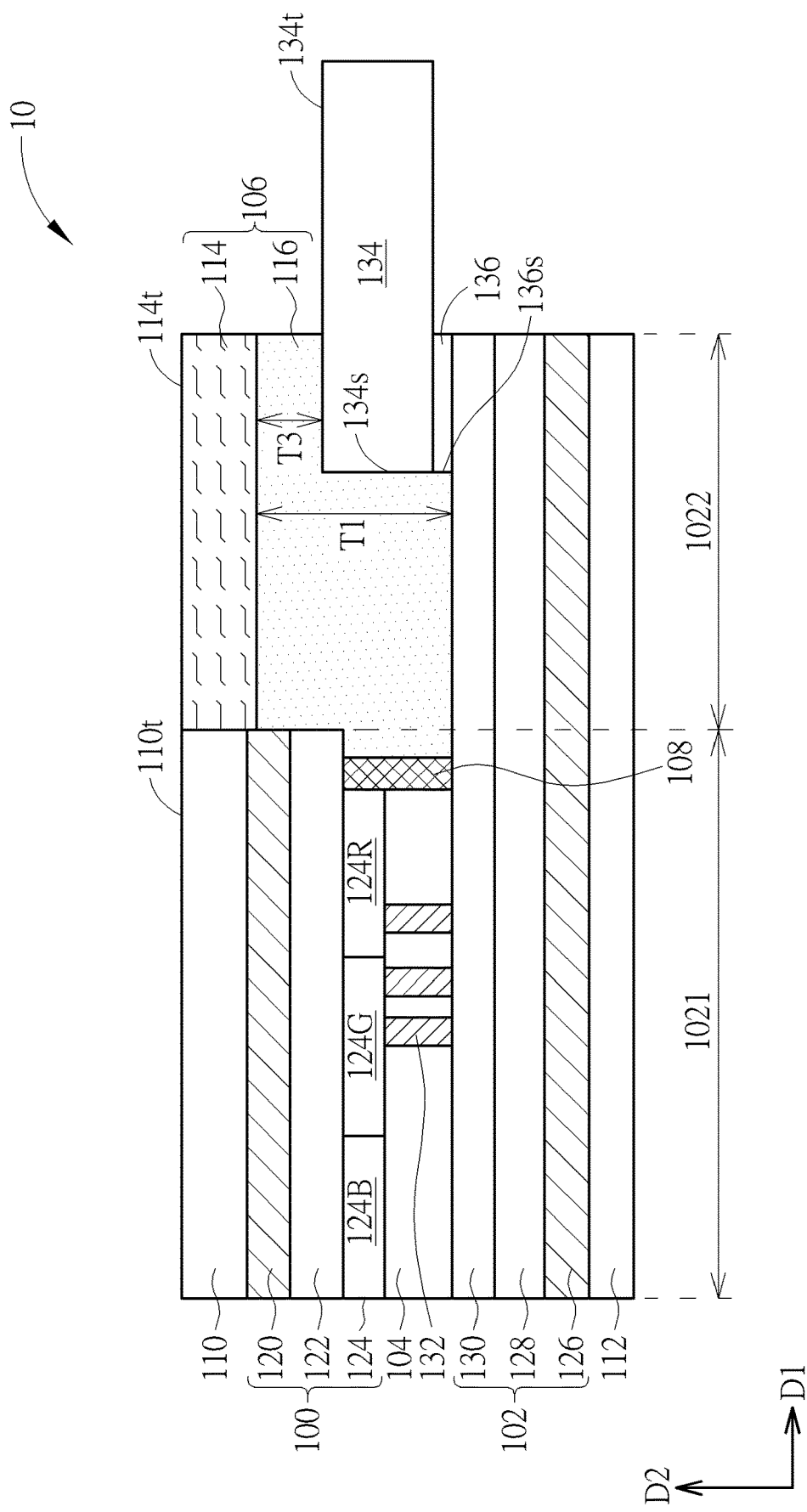
FIG. 5 is a schematic diagram of an electronic device of a fourth embodiment of the present disclosure.

Please refer to FIG. 5, which is a schematic diagram of an electronic device of a fourth embodiment of the present disclosure. The features different from those of the third embodiment will be detailed in the following, and the features identical to those of the above embodiments will not be described redundantly. In some embodiments, the supporting structure 106 may include a supporting film 114 and a glue 116, and the glue 116 may be disposed between the supporting film 114 and the thin film transistor layer 130 and/or between the chip on film 134 and the sealant 108, but not limited herein. In addition, the glue 116 may cover a portion of the chip on film 134, wherein the glue 116 may cover part of the top surface 134t of the chip on film 134, the side surface 134s of the chip on film 134 and the side surface 136s of the anisotropic conductive film 136, but not limited herein. For example, the thickness T3 of a portion of the glue 116 located between the supporting film 114 and the chip on film 134 may be 89 micrometers, and the thickness T1 of another portion of the glue 116 located between the supporting film 114 and the thin film transistor layer 130 may be 120 micrometers, but not limited herein.

The glue 116 may be a waterproofing glue, but not limited herein. The glue 116 may reduce the intrusion of vapor into the elements in the second region 1022 of the second flexible substrate 102. For example, the glue 116 may reduce the intrusion of vapor into the thin film transistor layer 130 along the top surface 134t of the chip on film 134, the side surface 134s of the chip on film 134 and the side surface 136s of the anisotropic conductive film 136. In addition, the glue 116 may also reduce the intrusion of vapor into the elements in the first region 1021 of the second flexible substrate 102 or the elements disposed thereon (such as the liquid crystal layer 104, the elements in the first flexible substrate 100, etc.), so as to improve the reliability or yield of the electronic device 10.

Figure 6:
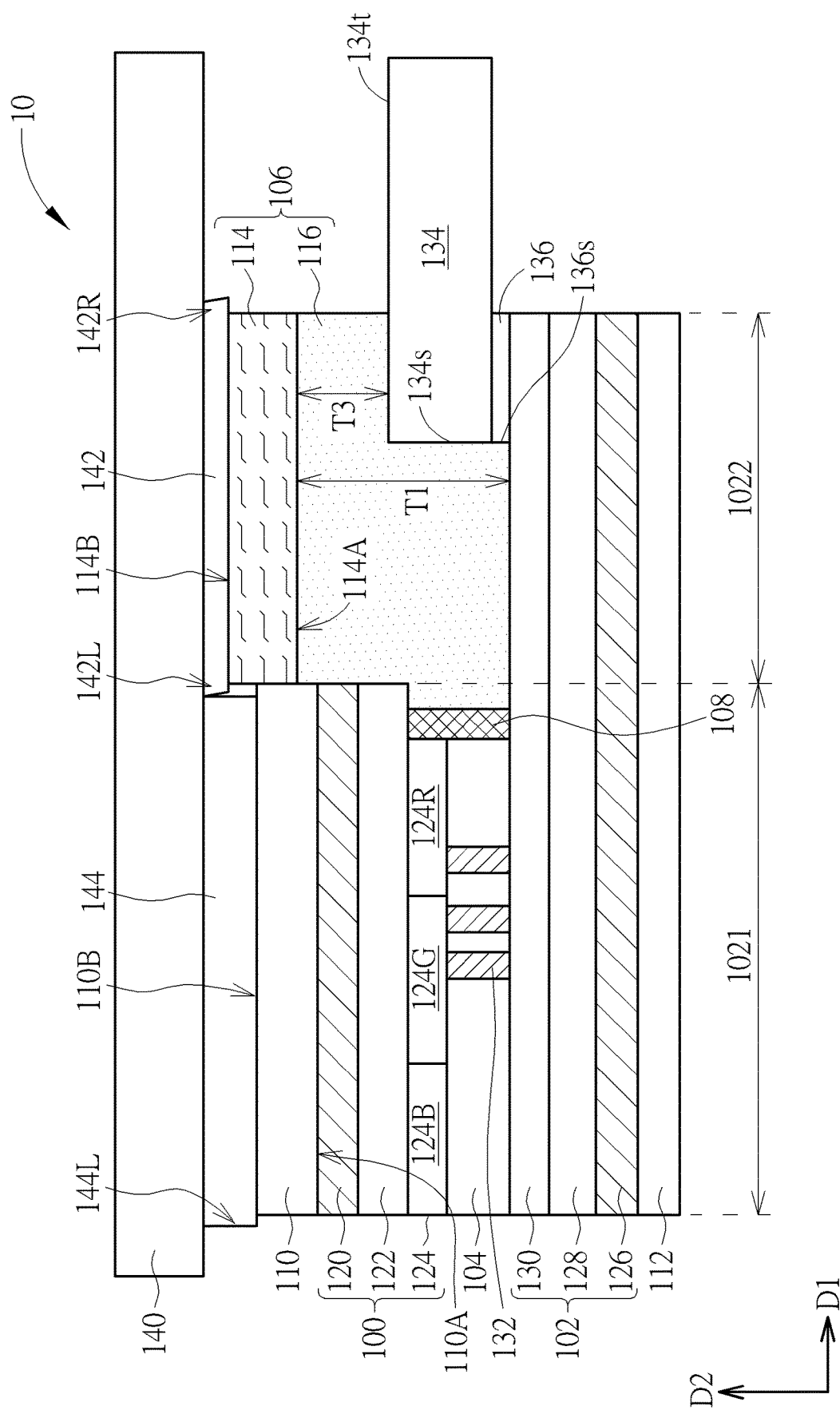
FIG. 6 is a schematic diagram of an electronic device of a fifth embodiment of the present disclosure.

Please refer to FIG. 6, which is a schematic diagram of an electronic device of a fifth embodiment of the present disclosure. The features different from those of the fourth embodiment will be detailed in the following, and the features identical to those of the above embodiments will not be described redundantly. In some embodiments, the electronic device 10 may further include a covering layer 140 disposed on the polarizer 110 and the supporting film 114, but not limited herein. In some embodiments, the material of the covering layer 140 may include glass, and the thickness of the covering layer 140 may be 0.4 millimeters, but not limited herein. In other embodiments, the material of the covering layer 140 may include poly(methyl methacrylate) (PMMA), and the thickness of the covering layer 140 may be 2 millimeters, but not limited herein. The length or area of the covering layer 140 may be greater than the length or area of the flexible base 126 (and/or the flexible base 120), but not limited herein.

In some embodiments, an adhesive 142 may be disposed between the supporting film 114 and the covering layer 140, and an optically clear adhesive (OCA) 144 may be disposed between the polarizer 110 and the covering layer 140, but not limited herein. As shown in FIG. 6, the polarizer 110 may include a first side 110A and a second side 110B opposite to the first side 110A. The first side 110A may face the second flexible substrate 102, and the second side 110B may be adhered to the covering layer 140 by the optically clear adhesive 144, but not limited herein. On the other hand, the supporting film 114 may include a first side 114A and a second side 114B opposite to the first side 114A. The first side 114A may face the second flexible substrate 102, and the second side 114B may be adhered to the covering layer 140 by the adhesive 142, but not limited herein. The extrusion may be caused when bonding the covering layer 140, so the adhesive 142 may at least include a protruding portion 142L and/or a protruding portion 142R, and the optically clear adhesive 144 may at least include a protruding portion 144L, as shown in FIG. 6, but not limited herein.

Since the Young's modulus (or stiffness) of the covering layer 140 may be greater than the Young's modulus (or stiffness) of the flexible base in the second flexible substrate 102, the curling of the second region 1022 of the second flexible substrate 102 may be reduced or mitigated by adhering the first flexible substrate 100 along with the second flexible substrate 102 to the covering layer 140, thereby reducing the chance of damage of the elements in the second region 1022 to improve the reliability or yield of the electronic device 10.

From the above description, the electronic device of the present disclosure may include a supporting structure disposed on the second region of the second flexible substrate. Therefore, the curling of the second region may be reduced or mitigated by the supporting structure, thereby reducing the chance of damage of the elements in the second region to improve the reliability or yield of the electronic device. In some embodiments, the supporting structure may include a supporting film. In other embodiments, the supporting structure may include a supporting film and a glue. The glue may reduce the intrusion of vapor into the elements in the second region of the second flexible substrate, or reduce the intrusion of vapor into the elements in the first region of the second flexible substrate or the elements disposed thereon, so as to improve the reliability or yield of the electronic device.

Although some embodiments of the present disclosure and their advantages have been described in detail, it should be understood that various changes, substitutions and alterations can be made herein without departing from the spirit and scope of the present disclosure by any one of ordinary skill in the art. In addition, the scope of the present disclosure is not intended to be limited to the process, machine, manufacture, composition of matter, means, methods and steps in the particular embodiments described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include such processes, machines, manufacture, compositions of matter, means, methods, or steps within their scope. Moreover, each of the claims constitutes an individual embodiment, and the scope of the disclosure also includes the scope of the various claims and combinations of the embodiments. The scope of the disclosure is subject to the definition of the scope of the claims. Any embodiment or claim of the present disclosure does not need to achieve all of the objects, advantages and features disclosed in the present disclosure.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. An electronic device, comprising:
a first flexible substrate;
a second flexible substrate comprising a first region and a second region, wherein the first region overlaps with the first flexible substrate, and the second region does not overleap with the first flexible substrate;
a liquid crystal layer disposed between the first flexible substrate and the second flexible substrate;
a supporting structure disposed on the second region and comprising a supporting film; and
a polarizer disposed on the first flexible substrate,
wherein the supporting film is disposed on a side of the polarizer in a first direction, and the supporting film is directly connected to an edge of the polarizer on the side, wherein the first direction is perpendicular to a top-view direction of the electronic device.

2. The electronic device according to claim 1, wherein the supporting structure further comprises a glue.

3. The electronic device according to claim 2, wherein the glue is a waterproofing glue.

4. The electronic device according to claim 3, wherein a material of the waterproofing glue comprises silica gel, polyurethane (PU), polycarbonate (PC), poly(methyl methacrylate) (PMMA) or polyethylene terephthalate (PET).

5. The electronic device according to claim 2, wherein the supporting film is adhered to the second region by the glue.

6. The electronic device according to claim 2, wherein a gap exists between the glue and the liquid crystal layer.

7. The electronic device according to claim 2, wherein the glue is disposed between the supporting film and the second flexible substrate.

8. The electronic device according to claim 2, wherein a thickness of the glue is greater than a thickness of the liquid crystal layer.

9. The electronic device according to claim 1, further comprising a covering layer, wherein the supporting film has a first side and a second side opposite to the first side, the first side faces the second flexible substrate, and the second side is adhered to the covering layer.

10. The electronic device according to claim 1, wherein the first flexible substrate or the second flexible substrate comprises a flexible base, and a Young's modulus of the supporting film is greater than a Young's modulus of the flexible base.

11. The electronic device according to claim 1, wherein the supporting film comprises a substrate, a first adhesive layer and a second adhesive layer, and the substrate is disposed between the first adhesive layer and the second adhesive layer.

12. The electronic device according to claim 11, wherein a material of the substrate comprises polyethylene terephthalate (PET), polypropylene (PP) or polyethylene (PE).

13. The electronic device according to claim 1, further comprising a chip on film disposed between the supporting structure and the second flexible substrate.

14. The electronic device according to claim 13, wherein the second flexible substrate comprises a thin film transistor layer, and the chip on film is electrically connected to the thin film transistor layer.

15. The electronic device according to claim 14, further comprising an anisotropic conductive film, wherein the chip on film is adhered to the thin film transistor layer by the anisotropic conductive film.

16. The electronic device according to claim 13, wherein a gap exists between the chip on film and the liquid crystal layer.

17. The electronic device according to claim 13, wherein the supporting structure further comprises a glue covering a portion of the chip on film.

\* \* \* \* \*